United States Patent [19]
Bell, Jr. et al.

[11] 3,987,271
[45] Oct. 19, 1976

[54] ELECTRICAL DISCHARGE MACHINING POWER SUPPLY CIRCUIT

[75] Inventors: Oliver A. Bell, Jr., Mooresville; Randall C. Gilleland, Statesville, both of N.C.

[73] Assignee: Colt Industries Operating Corporation, New York, N.Y.

[22] Filed: Sept. 11, 1974

[21] Appl. No.: 505,187

Related U.S. Application Data

[60] Continuation-in-part of Ser. No. 448,351, March 5, 1974, Pat. No. 3,927,293, which is a division of Ser. No. 251,352, May 8, 1972, Pat. No. 3,825,713.

[52] U.S. Cl. ............................................. 219/69 C
[51] Int. Cl.² .......................................... B23K 9/16
[58] Field of Search ............. 219/69 G, 69 C, 69 P, 219/69 S, 69 M, 69 R; 323/21; 317/124, 133, 265

[56] References Cited
UNITED STATES PATENTS

| | | | |
|---|---|---|---|
| 3,604,884 | 9/1971 | Olsson | 219/69 G |
| 3,649,802 | 3/1972 | Sennowitz | 219/69 C |
| 3,693,027 | 9/1972 | Garaway | 323/21 X |
| 3,697,719 | 10/1972 | Verner et al. | 219/69 C |
| 3,701,937 | 10/1972 | Combs | 323/21 |
| 3,705,969 | 12/1972 | Bell | 219/69 C |
| 3,717,741 | 2/1973 | Verner | 219/69 C |
| 3,777,102 | 12/1973 | Bell | 219/69 C |
| 3,789,182 | 1/1974 | Verner | 219/69 P |
| 3,808,392 | 4/1974 | Sennowitz | 219/69 P |
| 3,816,692 | 6/1974 | Ratmansky | 219/69 C |
| 3,825,713 | 7/1974 | Bell | 219/69 G |

*Primary Examiner*—Bruce A. Reynolds
*Attorney, Agent, or Firm*—Harry R. Dumont

[57] ABSTRACT

Included in the circuit are a pulse generator and an electronic output switch for providing machining power pulses across the EDM gap. The circuit includes an opti-coupling system intermediate the pulse generator and the output switch to pass triggering pulses to control the conduction of such switch. The opti-coupling system includes a light emitting device operably coupled to a light responsive device for controlling the triggering pulses passed to the output switch. In a further embodiment, a multiple gap set-up includes a single pulse generator for triggering pulses and a plurality of machining gaps, each having a separate opti-coupling system between the pulse generator and the associated gap.

2 Claims, 11 Drawing Figures

ELECTRICAL DISCHARGE MACHINING POWER SUPPLY CIRCUIT

REFERENCE TO RELATED APPLICATIONS

Reference is made to U.S. application Ser. No. 448,351, filed Mar. 5, 1974 on behalf of Oliver A. Bell, Jr., for "Function Control Circuit for EDM Power Supply" now U.S. Pat. No 3,927,293. The present application is a continuation-in-part of the above entitled application, which in turn is a division of application Ser. No. 251,352, filed May 8, 1972, now U.S. Pat. No. 3,825,713 issued July 23, 1974.

FIELD OF THE INVENTION

The present invention relates to an improvement in the use of combinations of light emitting and light responsive devices as they are incorporated in both single and multiple gap EDM power supplies and in which they are further used to allow for feed-back signals to the pulse generator which is a part of the power supply.

BACKGROUND OF THE INVENTION

The electrical discharge machining art has advanced from the early stages in which relaxation oscillators were used to provide machining power pulses. Independently timed and controlled pulse generators are now almost universally used and in these generators electronic switches are generally employed in the form of solid state switches or banks of parallel connected switches, particularly transistors. In the electrical discharge machining process, sometimes hereinafter referred to as "EDM", it is necessary that as the workpiece material is removed a predetermined gap be maintained between the tool electrodes and the workpiece through an automatic servo-feed system which provides a continuous advance into and toward the workpiece as the material removal progresses. During the electrical discharge machining process, a fluid coolant, generally a liquid, is circulated through the machining gap to flush the removed workpiece particles from the gap. The coolant is usually furnished under pressure by a pump through one or more openings provided in the electrode and workpiece. One necessary and defining characteristic of electrical discharge machining is that the coolant is a dielectric fluid, such as kerosene, transformer oil, distilled water or the like. The dielectric fluid is broken down in minute, localized areas by the action of the machining power pulses passed between the closely opposed surfaces of the tool electrode and workpiece and having its spacing known as the "EDM machining gap". For control of the servo-feed system, there is generally utilized an electrical signal from the machining gap in order to control the rate and the direction of servo-feed. In many cases, this gap signal is compared to an adjustable reference voltage so that the operator can select the rate of servo-feed desired for the particular machining condition.

It will thus be seen that with respect to the servo-feed of the gap elements in electrical discharge machining a parameter of the gap, whether it be average gap voltage as shown and described in Williams U.S. Pat. No. 2,841,686 issued July 1, 1958, peak gap voltage as shown and described in Webb Reissue 25,542 issued Mar. 24, 1964, or as in any other EDM servo-feed systems, there is required a reliable signal from the gap. The problem has been complicated by the fact that for certain electrode materials, such as graphite, the normal EDM gap polarity in which the tool electrode is negative and the workpiece positive must be reversed to provide for best machining results. Additional problems are encountered when the same power supply circuit is used to trigger the output switches of several different machining gaps, that is, where several spaced and insulated electrodes are used to simultaneously cut several holes in the same workpiece or, alternately, several electrodes are used to cut holes at the same time in different workpieces. As power supply circuits have come to require more power capability, lead lengths in order to handle the multiple gap systems have become longer and it has become continuously more difficult to provide for gap sensing and to provide for those circuit connections which will be immune to noise in the electrical system and provide reliable voltage signals to control servo-feed.

Other function control circuits are likewise dependent in their operation upon the magnitude of electrical signals derived from the machining gap, which signals again operate as an index to control, for example, interruption of power when a gap short circuit condition has occurred. The gap short circuit condition most often occurs due to a build-up of the eroded materials from both the electrode tool and workpiece to provide a bridging of the machining gap. Unless this condition is rapidly alleviated, either by electrode back-up by instantaneous interruption of power to the gap, serious damage can result to either or both the electrode tool and the workpiece. This problem has been solved by the prior art by the development of a number of gap short circuit protection systems such as that disclosed and claimed in Sennowitz U.S. Pat. No. 3,539,145 issued on Apr. 15, 1969 for "EDM Power Supply Circuit". The need of a reliable sensing system responsive to gap voltage to control such a protection system is particularly met by the system according to the present invention.

An additional problem arises from the failure of one or more of the electronic output switches, generally with their power conducting electrodes in a shorted condition. Power to the gap must be interrupted until the defective transistor can be located and replaced. The problem again is one of providing a reliable sensing circuit capable of responding to such a condition and providing an output signal to provide the necessary protection function control.

In some gap short circuit protection systems there is provided not a total interruption of the machining power but rather a control of the individual machining power pulses themselves such as by narrowing their on-time or increasing the off-time, or in some cases performing both these functions together. An example of an on-off time control system for controlling pulse width is disclosed in the aforementioned U.S. Pat. No. 3,825,713 of which the present application is a continuation-in-part.

By way of summary, it will be seen that the prior art protection systems of electrical discharge machining apparatus have the common problem of providing a control signal whether it be from the machining gap itself or from an intermediate part of the power supply such as from the electronic output switch, which signal represents an abnormal or malfunctioning condition and actuates a protection circuit to suitably respond either by way of interrupting the power to the gap, reducing the power to the gap, or initiating a servo-feed back-up operation to protect the gap elements from possible damage.

It will be understood in the specification that when I refer to "electronic switch" I mean any electronic control device having several electrodes comprising at least two principal or power conducting electrodes acting to control current flow in the power circuit, the conductivity between the principal electrodes generally being controlled by a control electrode within the switch whereby the conductivity of the power circuit is controlled statically or electrically without movement of mechanical elements within the switch. Included within the definition are transistors in which turn-on is accomplished by a control voltage applied to the transistor control electrode and in which turn-off is accomplished automatically in response to removal of that control voltage. Also included in the definition are devices of the gate type in which turn-on is accomplished by a control voltage applied to the control electrode, which control voltage may be then removed and in which turn-off is accomplished by application of a subsequent control voltage to the control electrode. An additional class of electronic switches, called "electronic trigger devices", falls within this definition and includes thyratrons, semi-conductor controlled rectifiers and the like. By "electronic trigger device" I mean any electronic switch of the type which is triggered on at its control electrode by a pulse and is turned off by reverse voltage applied for a sufficient time across its principal electrodes.

SUMMARY OF THE INVENTION

Viewed in its broadest sense in light of the prior art just discussed, the present invention provides an improved coupling network particularly adaptable for use in an electrical discharge machining power supply in which the pulse signal from the pulse generator is opti-coupled to the output switch and the gap. A single pulse generator is used with a plurality of outputs, each adaptable to provide a triggering pulse to the output switch of a different EDM gap or to a plurality of gaps tied together to increase, at the option of the operator, the power supplied to the workpiece and electrode. In each case, the triggering pulse from the pulse generator passes through a light emitting device, such as a light emitting diode, to provide a triggering signal through a light responsive device, such as a phototransistor or a photo diode, which in turn has an electrical conductivity controllable according to the energy level of the light given off by the light emitting device. The signal is generated from the pulse generator and to light emitting diodes such as for example, gallium phosphide diodes or, alternately, in different versions of the invention it is possible to use incandescent light bulbs or similar devices in which there is a light signal passed which is variable according to current being conducted through the device and thus available in turn to control the passage and the duration of the triggering pulse to the module controlling the individual EDM gap.

The advantages of such an opti-coupling system includes the feature that no direct electrical connection directly between the light emissive device and the photosensitive device is required. Thus, it will be seen that several different EDM gaps, each with its own pulse module, may be operated at the same time from a common pulse source, with the gaps having different polarity connection. It is possible to provide controlled signals and feed-back signals to the pulse generator from one or more of the different pulse modules and gaps to influence its operation in a manner which has already been explained in detail in the aforementioned U.S. patent application Ser. No. 448,351. This isolation has advantages in both the single gap and multiple gap EDM type power supply as are shown particularly in FIGS. 9 and 10 in the drawings.

The particular light emitting devices and light responsive devices shown in the different embodiments of the invention are capable of response times which are fast enough to respond to high frequency machining power pulses being passed from the pulse generator to the different pulse modules and gaps.

BRIEF DESCRIPTION OF THE DRAWINGS

In the drawings wherein like reference numerals have been used to designate like parts herein referred to throughout the several views.

DETAILED DESCRIPTION OF THE INVENTION

Figure 1:
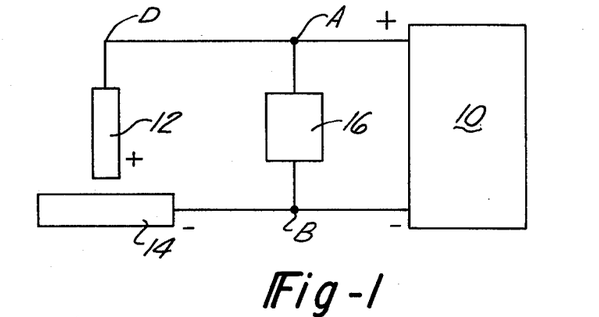
FIG. 1 is a block diagrammatic drawing illustrating an electrical discharge machining power supply.

FIG. 1 is a drawing showing an electrical discharge machining power supply 10 having its output connected across a machining gap between a tool electrode 12 and a workpiece 14. A more detailed showing of the basic operating parts of an EDM power supply will be shown in FIG. 6 hereinafter. A light emitting device 16, sometimes hereinafter referred to as an LED, may be embodied as light emitting diodes or bidirectional light emission devices such as incandescent light bulbs. In any case, the light emitting device used may be described as any device having a light energy output which is proportional to or a function of the input current density. Ordinarily, the light emitting device is then used in the manner shown in FIG. 2 to control the conductivity of a light responsive switching means such as a phototransistor to provide an electrical control output signal. It will be understood that in FIG. 1 the light emitting device 16 is connected across the gap between terminals A and B but, alternately, it may be connected in series with the gap between terminals A and D as shown.

Figure 2:
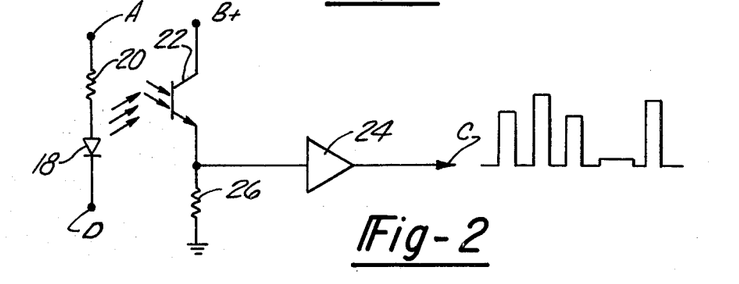
FIG. 2 is a schematic partly in block diagrammatic form showing one embodiment using a light emitting diode.

FIG. 2 shows a light emitting device embodied as a light emitting diode 18 which may be connected in series with the machining gap, for example, in series with the tool electrode 12. A suitable current limiting resistor 20 is connected in series with the light emitting diode 18. As indicated in the drawing, the light energy emitted by diode 18 is communicated to the base or control electrode of a phototransistor 22, which in turn provides an electrical control output signal through an intermediate amplifier stage 24 and thence to one or more of the function control circuits as will be further illustrated hereinafter. The phototransistor 22 has its collector coupled to a suitable B+ source and a load resistor 26 is connected in series with the emitter of the phototransistor 22. It will be seen that the electrical output signals have a variable amplitude which may fluctuate as shown at the right-hand side of FIG. 2.

Figure 3:
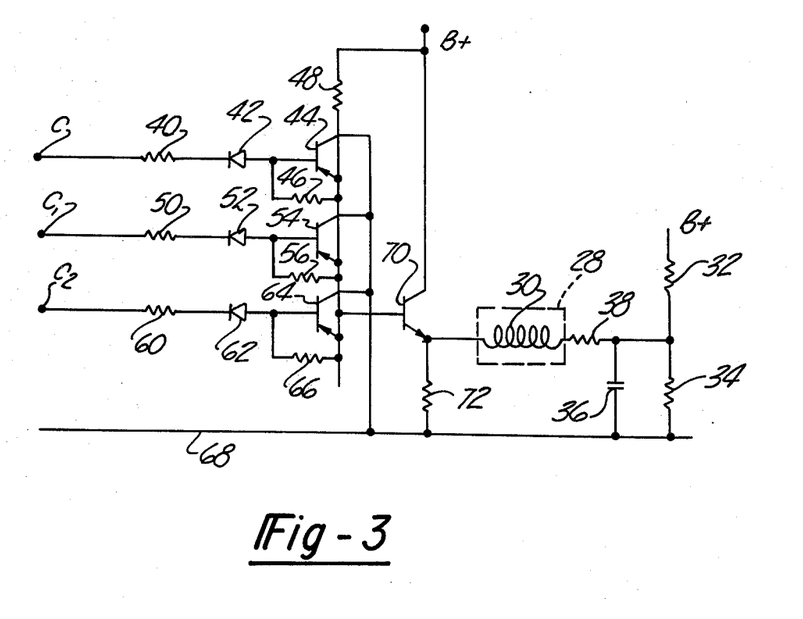
FIG. 3 is a schematic drawing showing a multiple lead servo-feed system for controlling the feed simultaneously of a plurality of tool electrodes.

The FIG. 3 schematic shows a servo-feed control system particularly useful in connection with multiple gap machining operation in which a plurality of outputs are passed through terminals in the manner indicated to control the sevo-feed motor, thus maintaining the proper gap spacing between the electrode 12 and workpiece 14. The basic control circuit may be connected, for example, to one terminal of a control coil 30 for a servo control valve indicated by the numeral 28. The circuit of FIG. 3 is adapted for use with a system in which the electrode carrying ram is operated by an electro-hydraulic motor for the motive means. It will be seen that the circuit of FIG. 3 includes a plurality of input means. As has already been indicated, an incandescent light bulb may be substituted for the light emitting diode 18, with the advantage that the polarity of the gap or its reversal has no effect on the light bulb operation as it relates to sensing current flow through the bulb. In the FIG. 3 circuit, the coil 30 of the servo valve 28 has connected at its right end a reference voltage. The resistors 32, 34, with filter capacitor 36 and a series resistor 38, serve to provide a reference voltage against which the control input signals from a plurality of gaps are used to provide a single control signal. In the FIG. 3 circuit, LEDs are connected in series with each of three different gaps. The output signal from the first of such phototransistors 22 is provided through a series resistor 40 and diode 42 to the base of an associated PNP transistor 44. The PNP transistor 44 has a resistor 46 coupled across its base and emitter, while a source of B+ voltage is connected through a series current limiting resistor 40 to the emitter of the transistor 44. The circuit just referred to is duplicated in each of the other two networks and with identifying numerals being applied to each corresponding element as follows: In association with the $C_1$ terminal, a series resistor 50, a signal diode 52, a transistor 54 and a resistor 56 are included. In the final lowermost branch associated with the $C_2$ terminal, there are included a series resistor 60, a diode 62, a transistor 64 and a resistor 66. It will be seen that the three transistors 44, 54 and 64 all have their collectors connected to a minus gap lead 68. The emitters of each of the aforesaid transistors are all connected to the base of a single, control transistor 70 of the NPN type. The transistor 70 has its collector connected to the B+ voltage source and a load resistor 72 is connected in series with its emitter. The emitter of the transistor 70 is also coupled to the left-hand terminal of the coil 30. It will be seen that when the gap voltage level at any of the three gaps being monitored drops to a sufficient level, there will be provided an increased output signal from its corresponding terminal C, $C_1$ or $C_2$. This will cause a correspondingly increased current flow from the transistor 70 to provide back-up through operation of the coil 30 and the electro-hydraulic motor to which it is connected. It will be understood that the control signal provided to the coil 30 is related to the excursions occurring in gap voltage.

Figure 4:
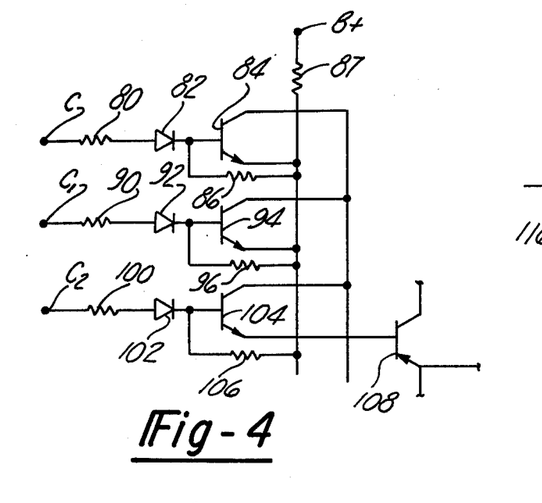
FIG. 4 is a servo-feed circuit substantially similar to that shown in connection with FIG. 3 but incorporating a different polarity type transistor switch.

The circuit of FIG. 4 is quite similar to the circuit of FIG. 3 except that the input signals from the several sensing networks at terminals C, $C_1$ and $C_2$ are of the opposite polarity so that the included diodes are shown in their reversed connection and the plurality of transistors incorporated in the control circuit are NPN transistors rather than PNP transistors. The control transistor 70 has been changed to a transistor of the PNP type. The circuit included in the C lead includes a series resistor 80, a diode 82, an NPN transistor 84 and a shunt resistor 86. A suitable magnitude B+ source is connected to the upper terminal of a resistor 87. In the $C_1$ lead, there are connected a resistor 90, a diode 92 having its cathode connected to the base of an NPN transistor 94, and a resistor 96 connected across the base emitter junction of the transistor 94. In the $C_2$ network, there are included a series resistor 100, a diode 102 having its cathode connected to the base of an NPN transistor 104, and a resistor 106 connected across the base emitter junction of the transistor 104. The transistors 84, 94 and 104 are all connected in common emitter configuration and provide a control signal to the base of the control PNP transistor 108. The remaining elements of the circuit, including the servo valve, coil and reference voltage, are the same as that shown in FIG. 3 and have been omitted in the interest of simplification. It will be seen that whenever the gap voltage drops to a level approaching gap short circuit level, the LED associated with that gap will experience a change in its output of light energy, which change is communicated to the associated phototransistor or photo diode to provide a control electrical signal through the several networks to terminals C, $C_1$ and $C_2$ thus to control the current flow through the servo coil 30 to provide back-up of the ram. It will be understood that in the case of multiple electrode operation, the several electrodes are generally insulated one from the other and mounted on a common ram. When a gap short circuit is experienced with respect to one of the electrodes, all of them are then backed up to alleviate the short circuit condition. The response time of the LEDs is sufficiently rapid to respond to pulse by pulse changes in the machining power pulses being passed across the gap and, accordingly, the response time of the servo system is sufficiently rapid to remove the electrodes from the workpiece before damage can occur. The circuit of FIG. 4 has additional advantages that may be used with sensing networks other than those incorporating LEDs. For example, the input at terminals C, $C_1$ and $C_2$ may be derived from simple diode-capacitor sensing networks, in which case the input would be representative of peak gap voltage level or, alternately, from a resistor-capacitor network, in which case the input would be representative of average gap voltage.

Figure 5A:
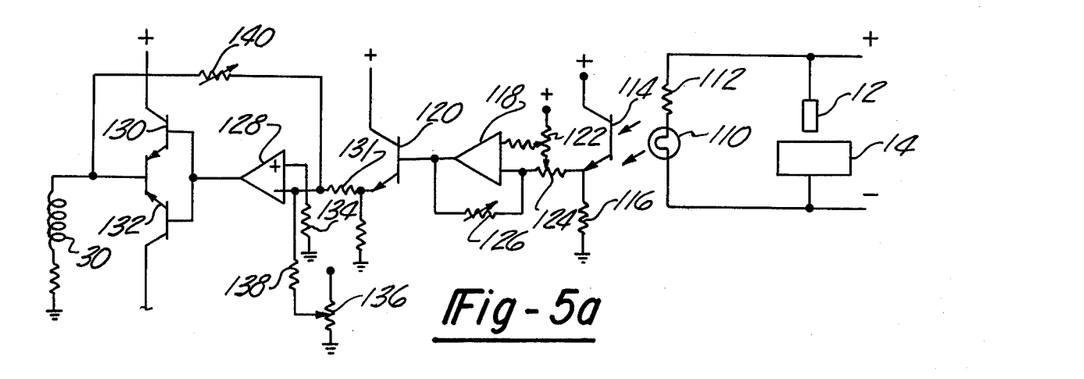
FIG. 5a is a schematic showing of one embodiment of the present invention for use in conjunction with a servo-feed system.

FIG. 5a shows a servo control system in which the LED is embodied as an incandescent light bulb 110 connected in series combination with a resistor 112, with the combination coupled across the machining gap between the electrode 12 and the workpiece 14. The light energy output from the bulb 110 is transmitted to the base of a phototransistor 114 to control its conductivity. The phototransistor 114 has a load resistor 116 connected in series with its emitter and an intermediate amplifier stage 118 is coupled between the emitter of the phototransistor 114 and a second transistor 120. Associated with the amplifier 118 are a null adjust potentiometer 122, a series signal resistor 124 and a variable resistor 126 for gain adjustment. A second amplifier stage 128 is connected to the output from the transistor 120. The signal from the emitter of the transistor 120 is passed through a signal resistor 131 and amplified to provide a control signal for a following push-pull stage incorporating a pair of transistors 130 and 132. The amplifier stage 128 has a resistor 134 connected to a selectively adjustable servo reference voltage provided by a potentiometer 136. A fixed magnitude series resistor 138 is connected between the slider of the potentiometer 136 and the minus input terminal of the amplifier 128. It will be seen that the transistors 130 and 132 are of NPN and PNP configuration, respectively, so that one or the other is rendered conductive according to the signal received at its base. The direction and magnitude or current flow through the servo control valve coil 30 is thus suitably regulated to provide an upfeed or downfeed of the electrode 12 in accordance with the level of gap voltage being sensed by LED bulb 110, and subsequently converted to an amplified electrical control signal by the circuit. A suitable gain adjust rheostat 140 is connected in the circuit as shown.

Figure 5B:
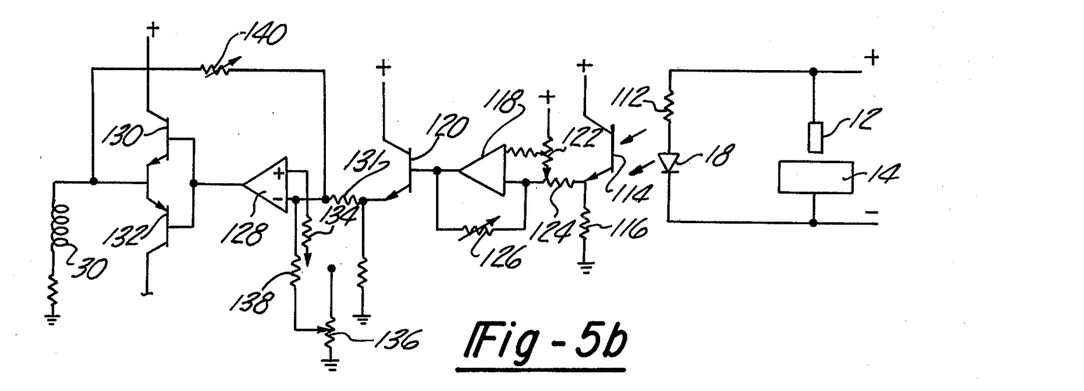
FIG. 5b is a schematic showing an alternate embodiment of the present invention for use in conjunction with a servo-feed system.

The circuit of FIG. 5b is essentially the same as that of FIG. 5a except for the inclusion of a light emitting diode 18 in place of the light bulb 110 of FIG. 5a. In like manner to the circuit of FIG. 5a, there are included several intermediate amplification stages between the phototransistor 114 and push-pull stage of transistors 130 and 132 so that the conduction of one or the other will control the direction of current flow through the servo control coil 30 and hence the control of the upfeed or downfeed of the electrode 12 in accordance with the changes occurring in gap voltage. The basic operating principles of the two circuits are based upon the fact that the impinging light energy is capable of releasing current carriers in the semi-conductor material of the phototransistor 114. Otherwise stated, the light energy provided by the light emitting device, whether it be the diode 18 or the light bulb 110, will free current carriers, thereby reducing the resistance of the material.

Figure 6:
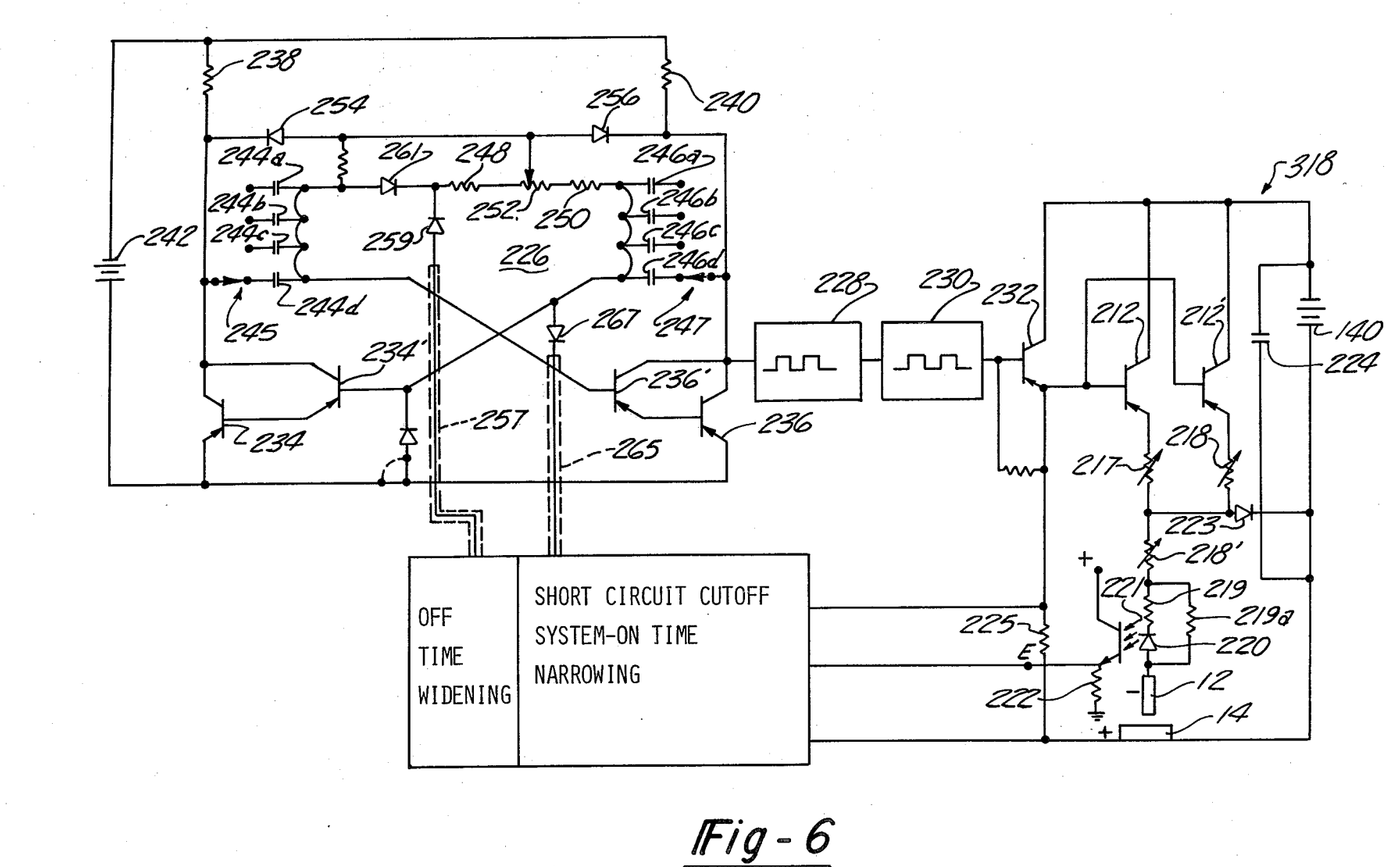
FIG. 6 is a simplified schematic illustration of an EDM power supply in which the present invention is utilized to control a short circuit protection system to adjust machining power pulse on-off time duration.

FIG. 6 is a combined schematic and block diagrammatic drawing of an electrical discharge machining power supply in which the main DC machining power source 140 is shown connected in series with the power conducting or principal electrodes of a pair of parallel connected output transistors 212 and 212' and in series with the machining gap which includes the electrode 12 and the workpiece 14. It will be seen that the polarity of the gap is different from that previously illustrated in the other drawings of this application and the tool electrode 12 is of the negative polarity as normally used with metallic type electrodes. The gap current level is selectively controlled by the magnitude of series resistors 217, 218 and 218'. A light emitting diode 220 is connected between the tool electrode 12 and the output stage transistors 212 and 212' to provide a light output signal for the control of the electrical output signals of the associated phototransistor 221. The diode 220 is connected in series combination with a resistor 219 and the combination is connected across a resistor 219a. A resistor 222 is coupled between the emitter of the phototransistor 221 and ground. A terminal E serves as the gap voltage input terminal to a system for controlling short circuit on-time narrowing and off-time widening. Reference is made to U.S. Pat. No. 3,705,969 for a full description of the circuit, its components and the preferred mode of operation of the short circuit cut-off system indicated in block form in FIG. 6. The importance of that circuit in conjunction with the present invention is a new and improved system for sensing an electrical parameter of the gap and providing an electrical output signal for function control of the EDM power supply. A diode 223 is used to connect the transistors 212 and 212' to the positive terminal of the DC source 140 to eliminate damaging high voltage spikes. A capacitor 224 provides decoupling to eliminate voltage drops due to lead inductance from the power source 140. A multivibrator stage 226 and several intermediate driver stages 228, 230 and 232 are used to turn the output stage transistors 212 and 212' on and off with precisely controllable frequency and pulse duty factor. The resistor 225 forms a DC ground for the driver transistor 232. In the interest of simplification and brevity, the driver stages 228 and 230 have been illustrated in block diagram form.

The multivibrator 226 includes transistor pairs 234, 234' and 236, 236'. Each transistor pair is biased and coupled for alternate switching operation in the astable multivibrator mode. The two respective transistor pairs are themselves compound-connected in the Darlington configuration and operate in effect as a single electronic switching unit to provide for the necessary current amplification. The transistors 234 and 236 are each connected through a pair of load resistors 238 and 240 to the negative terminal of a DC source 242. A bank of cross-coupling capacitors 244a through 244d and 246a through 246d are connected to the multivibrator transistor switches through the selective setting of a pair of switches 245 and 247, respectively. It will be seen that the switches 245 and 247 function to cross-couple the collectors of the two transistors 234', 236', each to the opposing transistor pair base, to control the frequency of the machining power pulses provided to the machining gap. The switches 245 and 247 are normally connected for ganged operation. A pair of fixed resistors 248 and 250 and a potentiometer 252 are included in the multivibrator circuit, with the machining pulse on-off time controlled by the setting of the movable contact of the potentiometer 252. Also included in the multivibrator 226 are a pair of control input networks which control the off-time widening of the multivibrator 226 through the transistor 234 or control the on-time reduction of the multivibrator 226 through the transistor 236. The first such input network includes the lead 257 and diodes 259 and 261 coupled as shown. The second such input network includes a lead 265 and a diode 267 which provide an input to control the on-time of the multivibrator transistor 236. The pulse on-time is controlled in phase with the conduction of the transistors 236, 236'. The pulse off-time is controlled in phase with the conduction of the transistors 234, 234'. It will be noted that while the present invention and its several different embodiments utilize transistors as the electronic switches throughout the circuits, the invention is not so limited. Thus, with proper redesign of the circuit by those skilled in the art, any electronic switch in accordance with the definition previously supplied may be substituted.

The circuit of FIG. 6 will thus be seen to exemplify a circuit utilizing as a function control signal a signal derived from an LED. In the FIG. 6 circuit, a light emitting diode is coupled in series with the machining gap and used with a pick-up phototransistor 221, which changes the light intensity signal into a proportionate electrical signal to control machining current being provided to the gap on an averaged pulse basis. Here again, the LED is used in the circuit to replace a standard sensing circuit which would include rather more complex networks, generally with electronic switches or diodes, which would generally be limited in their operation to an EDM circuit with one polarity of gap connection.

Figure 7:
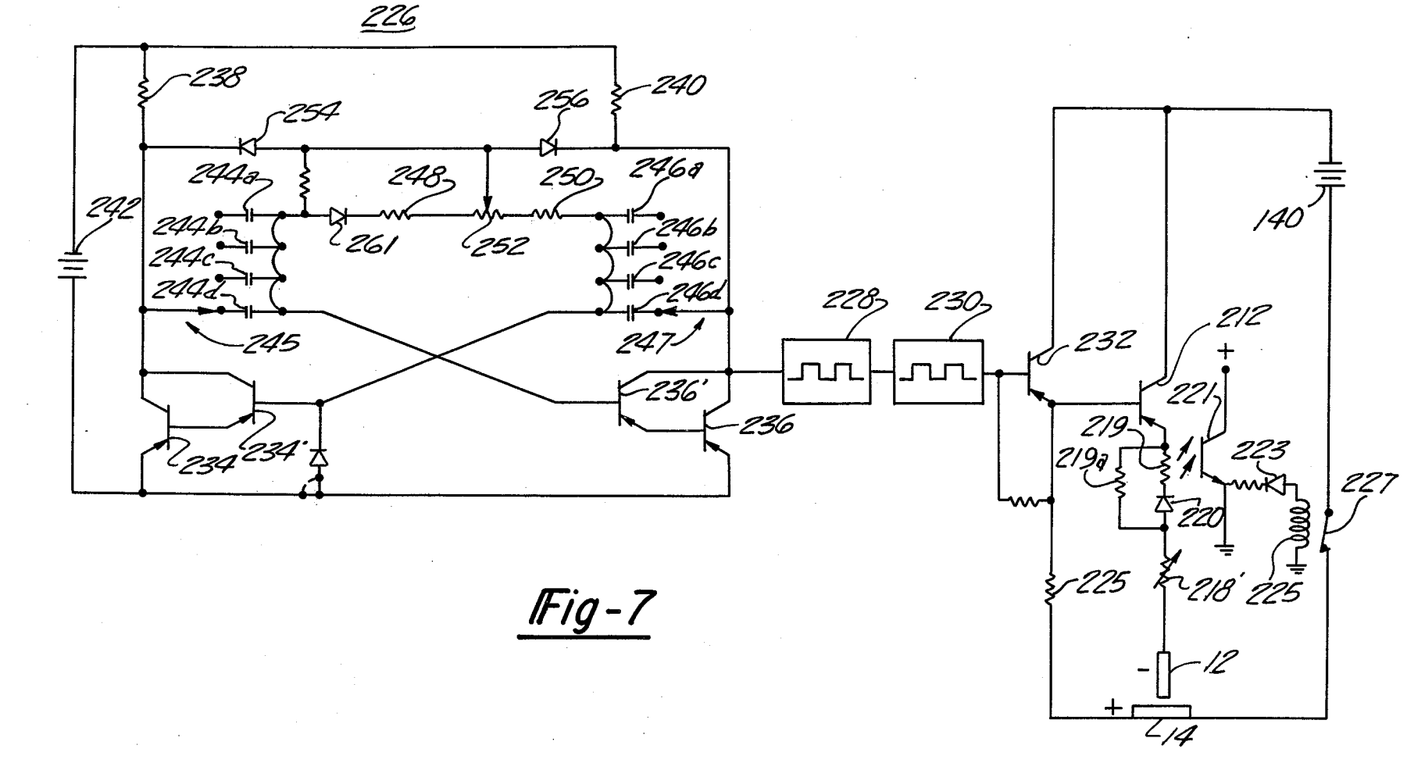
FIG. 7 is a schematic representation of an EDM power supply showing a voltage sensing network according to the present invention used to control power interruption responsive to failure of one of the output electronic switches or transistors.

The circuit of FIG. 7 illustrates the use of an LED for a different function control with respect to an electrical discharge machining power supply. The showing of the circuit of FIG. 7 is substantially similar to the circuit of FIG. 6 but somewhat abbreviated. The circuit of FIG. 7 shows a light emitting diode 220 which is connected with one of the principal electrodes or power conducting electrodes of the output transistor 212. The output transistors in any electrical discharge machining power supply are required to operate at very high frequencies and in some cases at relatively long on-times, which render their failure in a shorted condition possible. Should any of the output transistors 212 fail, there will be a surge of current to the tool electrode 12 and to the gap which may initiate a DC arcing or gap short circuit condition with damage to the gap elements and to other parts of the EDM power supply. For this reason, it is important to provide a sensing network with sufficiently rapid response time to sense the failure of the output transistor 212 and make a timely reduction in the power being furnished to the gap. In the FIG. 7 circuit, the LED 220 is operatively connected to the base of a phototransistor 221 in such manner as to control the output through its emitter and through a signal resistor 222 through an intermediate amplifier stage 223 and thence through the solenoid coil 225 which controls the opening and closing of a movable contact 227. The contact 227 is a normally closed contact to permit power to be connected to the gap between electrode 12 and workpiece 14, with the power being alternately connected and disconnected according to the controlled conduction of the output transistor 212. Upon failure of the transistor 212, a suitable actuating signal will be passed through solenoid coil 225 to pull the movable contact 227 open and thus interrupt the power to the gap to avoid damage to the elements. It will be understood that other commonly known disconnect devices or circuits may be used to reduce the power to the gap in the event of a failure of an output transistor 212.

Figure 8:
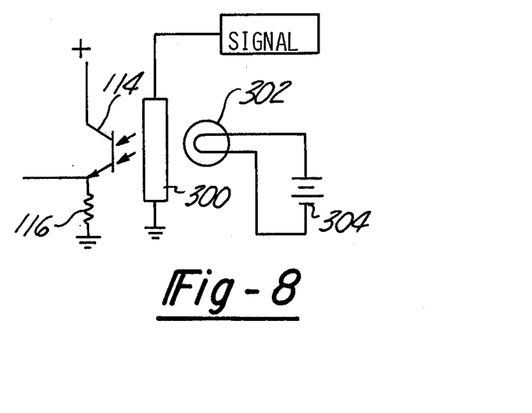
FIG. 8 is a schematic showing a liquid crystal embodiment of a light emitting device.

FIG. 8 illustrates an alternate embodiment for the light emitting device in the form of a liquid crystal 300. A control signal such as from the machining gap is used to vary the light transmitting properties of the crystal 300. A continuous light source, including bulb 302 and a DC source 304, is mounted at the right-hand side of the crystal 300.

Figure 9:
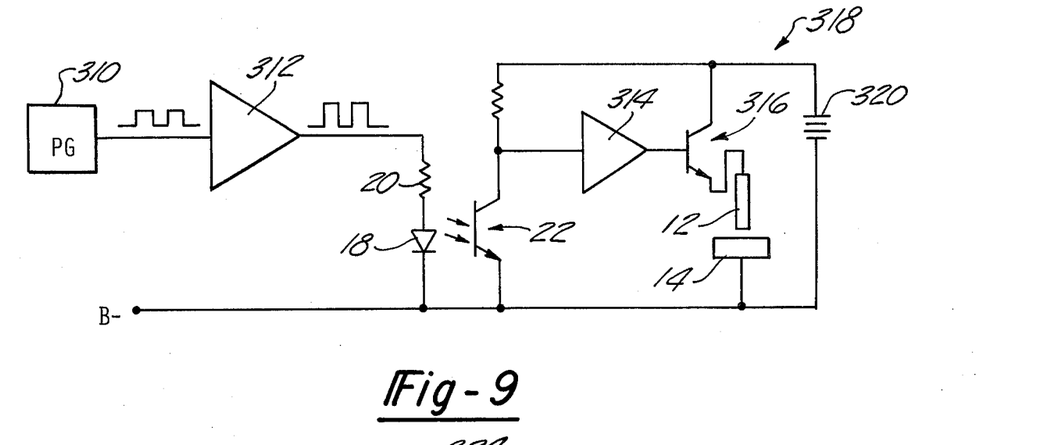
FIG. 9 is a schematic showing of a single gap set-up with an opti-coupling system between the pulse generator and the power module.
Figure 10:
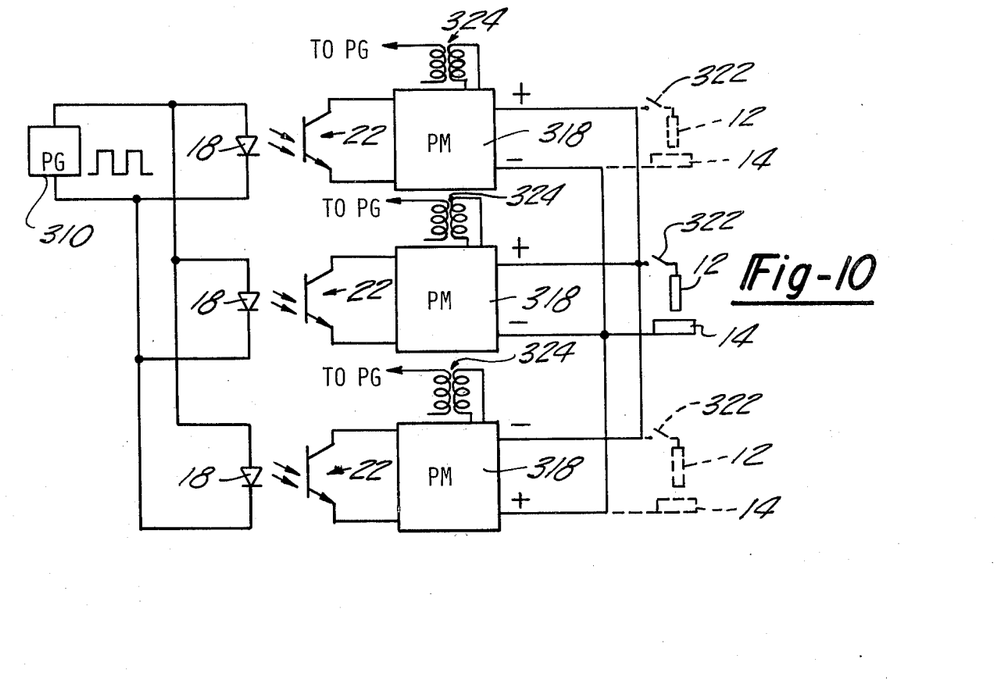
FIG. 10 is a view similar to FIG. 9 but showing a multiple EDM gap set-up including an opti-coupling stage.

FIGS. 9 and 10 are drawings illustrating the use of an opti-coupling system for an EDM power supply of the single and multiple gap types, respectively. FIG. 9 shows a pulse generator 310 that may be embodied in the form of an astable multivibrator such as multivibrator 226 of FIG. 6 and which is used to provide triggering pulses of controllable on-off time through an amplifier stage 312 and to the series combination of a resistor 20 and photo diode 18. A phototransistor 22 has its base operatively connected to the photo diode 18 in such manner that there is coupling provided and triggering pulses are passed which in turn are amplified through an amplifier stage 314 and then used to control the conduction of an output switch-transistor 316 which is in series with an EDM gap including electrode tool 12 and workpiece 14. In a like manner to the circuits earlier shown and described, a DC power supply 320 is further connected in series with the EDM gap. A numeral 318 is used to indicate the power module which includes the amplifier 314, the output switch 316 and the DC power supply 320. To simplify the drawing of FIG. 10, each power module 318 is shown in block form. In the FIG. 10 drawing, a multiple gap set-up is shown partly in dash line in which there are three different opti-coupling stages, each associated with a different machining gap including a tool electrode 12 and a workpiece 14. The different output circuits for the different gaps may be selectively coupled by the closure of switches 322 as shown in the middle gap set-up. It is possible to derive and pass a control signal back to the pulse generator 310 to control the on-off time of the pulse generator 310 or, alternately, to turn it off should gap short circuit or other undesirable gap condition be present. One or more current sensing transformers 324 may be used for this purpose. It is noted that the gap polarity of each of the different gaps may be changed independently of the other and the triggering will continue from a preselected plurality of outputs, all triggered by a single common pulse generator 310. The power supply circuit will be seen to provide versatility in that additional stages, that is output stages, may be added simply and easily, still utilizing the single pulse generator as a source for triggering pulses.

It will thus be seen that by our invention we have provided a new and improved type of EDM power supply circuit, particularly with respect to the system by which the pulse generator is coupled to control conduction of the output switch and machining in one or more of a selected plurality of EDM gaps.

What is claimed is:

1. In an electrical discharge machining apparatus having a multiple gap set-up for providing electrical discharge machining across a plurality of EDM gaps at the same time, each of said gaps having associated with it a different power source and an associated periodically operated electronic output switch having a control electrode, wherein there is provided a common pulse generator for each of said output switches and therein there is further provided intermediate the pulse generator and each output switch means and its said control electrode a separate means for providing a triggering signal output for said output switch comprising a liquid crystal device having a continuous light source operably connected thereto and operatively connected to said pulse generator for providing a light output signal of varying energy from said generator, said output switch further having a light responsive device comprising a phototransistor having a base and a pair of power conducting electrodes and coupled intermediate it and said liquid crystal device for receiving and converting such light output signal into machining power pulses for its associated gap.

2. The combination as set forth in claim 1 wherein said phototransistor has its base excited by the light signal from said liquid crystal device and has its power conducting electrodes operatively connected to said output switch control electrode.

* * * * *